United States Patent
Wu et al.

(10) Patent No.: US 8,985,801 B2
(45) Date of Patent: Mar. 24, 2015

(54) LIGHT GUIDE PLATE FIXING STRUCTURE AND A BACKLIGHT MODULE USING THE SAME

(71) Applicant: Shenzhen China Star Optoelectronics Technology Co., Ltd., Shenzhen, Guangdong (CN)

(72) Inventors: Zexin Wu, Guangdong (CN); Yuchun Hsiao, Guangdong (CN); Tian Zhang, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 14/001,871

(22) PCT Filed: Jun. 28, 2013

(86) PCT No.: PCT/CN2013/078335
§ 371 (c)(1),
(2) Date: Aug. 28, 2013

(87) PCT Pub. No.: WO2014/169532
PCT Pub. Date: Oct. 23, 2014

(65) Prior Publication Data
US 2014/0313773 A1    Oct. 23, 2014

(30) Foreign Application Priority Data

Apr. 19, 2013    (CN) .......................... 2013 1 0138007

(51) Int. Cl.
G09F 13/04    (2006.01)
F21V 7/04     (2006.01)
F21V 8/00     (2006.01)

(52) U.S. Cl.
CPC .................... *G02B 6/0081* (2013.01)
USPC ........ 362/97.4; 362/97.3; 362/97.1; 362/612; 362/615

(58) Field of Classification Search
CPC ..................... G02F 1/13357; G02F 1/133524
USPC .............................. 362/97.1–97.3, 615–629
See application file for complete search history.

(56) References Cited

U.S. PATENT DOCUMENTS

2013/0300972 A1* 11/2013 Wu, Ze-Xin .................... 349/58

FOREIGN PATENT DOCUMENTS

| CN | 201359237 Y | * | 12/2009 |
| CN | 102654601 A | * | 9/2012 |
| CN | 203517521 U | * | 4/2014 |
| JP | 2012138345 A | * | 7/2012 |

* cited by examiner

*Primary Examiner* — Mariceli Santiago

(57) ABSTRACT

A light guide plate fixing structure and a backlight module using the same, comprising a first abutting wall formed at the side edge of the light guide plate, a second abutting wall formed on the backplane, and a constant-force spring arranged between the first abutting wall and the second abutting wall; the constant-force spring has a fixing end and a support end, the fixing end being fixed on the first abutting wall, the support end forming an elastic foot that abuts against the second abutting wall, with the light guide plate being fixed with the help of the elastic force produced by bounce of the constant-force spring after being pre-compressed: when the light guide plate is expanded, it can push the spring away and be released and expanded; when the light guide plate is contracted, rebound of the spring will make the spring move with the light guide plate.

7 Claims, 5 Drawing Sheets

LIGHT GUIDE PLATE FIXING STRUCTURE AND A BACKLIGHT MODULE USING THE SAME

FIELD OF THE INVENTION

The present invention relates to the field of manufacture of liquid crystal display devices, more specifically to a light guide plate fixing structure and a backlight module using the same.

BACKGROUND OF THE INVENTION

A backlight module is an essential component of LCD devices. The backlight module usually includes a light guide plate, an LED array and a backplane, wherein the light guide plate is in parallel and fixed together with the backplane, the LED array is arranged between the light guide plate and the backplane. In the prior art, the light guide plate and the backplane are assembled generally by engaging the light guide plate to the backplane via a riveting column, or by filling a rubber pad between the light guide plate and the backplane so as to fix the light guide plate through the interference fit. However, the light guide plate, because of its prominent expansion attribute, has not only the thermal expansion attribute but also the hygroscopic expansion attribute, making both of the above two assembly methods have defects. If the light guide plate is fixed by the riveting column, with the riveting column made of a rigid material, when the light guide plate is expanded due to heat or moisture, because its expansion is subjected to restriction of the riveting column, the riveting column is hard to be pushed to move with the expansion, and therefore expansion cannot be released evenly, which easily results in an inhomogeneous deformation, making the light guide direction have deviation and distortion. If a rubber pad is used for fixing the light guide plate, because there is a nonlinear relationship between the elastic force and the degree of deformation generated by the rubber material, when the light guide plate is expanded to compress the rubber pad, the elastic force applied to the light guide plate will become increasingly large with the degree of compression, and thereby the amount of expansion that can be released by the light guide plate is not much, while a greater elastic force generated by the rubber pad may cause serious deformation on the stress portion of the light guide plate. Thus, with the light guide plate fixing structure of the prior art, the LCD device will suffer a reduced display effect inevitably during application because of expansion of the light guide plate. Therefore, this fixing structure needs to be improved urgently, so as to improve the product quality and enhance the user experience.

SUMMARY OF THE INVENTION

This patent puts forward a light guide plate fixing structure and a backlight module using the same, so as to meet the requirements of industrial production of the LCD device, make the light guide plate firmly and conveniently fixed on the backplane, and meanwhile overcome such problems as a reduced display effect resulted from expansion of the light guide plate during the use.

A light guide plate fixing structure, for fixing a light guide plate on a backplane of a backlight module, wherein the light guide plate fixing structure comprises a first abutting wall formed at a side edge of the light guide plate, a second abutting wall formed on the backplane, and a constant-force spring arranged between the first abutting wall and the second abutting wall; the constant-force spring has a fixing end and a support end, the fixing end being fixed on the first abutting wall, the support end forming an elastic foot that abuts against the second abutting wall.

In the light guide plate fixing structure of the present invention, the first abutting wall is provided with a recess adapted to shape of the fixing end, which is fixed inside the recess with the help of an elastic force produced by bounce of the constant-force spring after being pre-compressed.

In the light guide plate fixing structure of the present invention, the fixing end is fixed by a bolt or glued to the first abutting wall.

In the light guide plate fixing structure of the present invention, there are four first abutting walls, which are formed on the four side edges of the light guide plate, respectively; the second abutting wall is box-shaped, and accommodates the light guide plate; there are a plurality of the constant-force springs, whose fixing ends are fixed on the four first abutting walls, respectively, with the amount of the constant-force springs fixed on each of the first abutting walls not less than 2.

In the light guide plate fixing structure of the present invention, there are two first abutting walls, which are respectively formed at two of the four side edges of the light guide plate that are in parallel with each other; the second abutting wall is box-shaped, and accommodates the light guide plate; there are a plurality of the constant-force springs, whose fixing ends are fixed on the two first abutting walls, respectively, with the amount of the constant-force springs fixed on each of the first abutting walls not less than 2.

The present invention further provides a backlight module, which comprises a light guide plate, an LED array and a backplane, with the LED array arranged between the light guide plate and the backplane, wherein the backlight module further comprises a first abutting wall formed at the side edge of the light guide plate, a second abutting wall formed on the backplane, and a constant-force spring arranged between the first abutting wall and the second abutting wall; the constant-force spring has a fixing end and a support end, the fixing end being fixed on the first abutting wall, the support end forming an elastic foot that abuts against the second abutting wall.

In the backlight module of the present invention, the first abutting wall is provided with a recess adapted to shape of the fixing end, which is fixed inside the recess with the help of an elastic force produced by bounce of the constant-force spring after being pre-compressed.

In the backlight module of the present invention, the fixing end is fixed by a bolt or glued to the first abutting wall.

In the backlight module of the present invention, there are four first abutting walls, which are formed on the four side edges of the light guide plate, respectively; the second abutting wall is box-shaped, and accommodates the light guide plate; there are a plurality of the constant-force springs, whose fixing ends are fixed on the four first abutting walls, respectively, with the amount of the constant-force springs fixed on each of the first abutting walls not less than 2.

In the backlight module of the present invention, there are two first abutting walls, which are respectively formed at two of the four side edges of the light guide plate that are in parallel with each other; the second abutting wall is box-shaped, and accommodates the light guide plate; there are a plurality of the constant-force springs, whose fixing ends are fixed on the two first abutting walls, respectively, with the amount of the constant-force springs fixed on each of the first abutting walls not less than 2. A light guide plate fixing structure, comprising a constant-force spring arranged between the side wall of the light guide plate and the side wall of the backplane, wherein the constant-force spring is fixedly connected with the side wall of the light guide plate, and the foot at the bottom end abuts against the side wall of the backplane.

The backlight module and its light guide plate fixing structure of the present invention, having a firm structure and a reduced cost, can fix the light guide plate firmly and uniformly while effectively release the expansion of the light guide plate, so as to avoid inhomogeneous deformation of the light guide plate because of expansion.

BRIEF DESCRIPTIONS OF THE DRAWINGS

For explaining the technical solution of the examples of the present invention more clearly, the diagrams to be used in the examples will be briefly introduced in the following. Obviously, the diagrams below are only one example of the present invention, and those of ordinary skill in the art can further obtain other diagrams according to these diagrams without making any inventive effort.

FIGS. 2-1 and 2-2 are partial structural schematic diagrams of the light guide plate fixing structure provided by the first preferred example of the present invention;

FIGS. 3-1 and 3-2 are partial structural schematic diagrams of the light guide plate fixing structure provided by the second preferred example of the present invention;

FIGS. 4-1 and 4-2 are partial structural schematic diagrams of the light guide plate fixing structure provided by the third preferred example of the present invention; and FIGS. 5-1 and 5-2 are schematic diagrams of the backlight module provided by the preferred example of the present invention.

DETAILED DESCRIPTION OF THE EMBODIMENTS

The technical solution in the examples of the present invention will be described clearly and completely below with reference to diagrams. Obviously, the described examples are only part rather than all of the examples of the present invention. All other examples obtained by those of ordinary skill in the art according to the examples of the present invention without making any inventive effort all fall within the scope of protection of the present invention.

Figure 1:
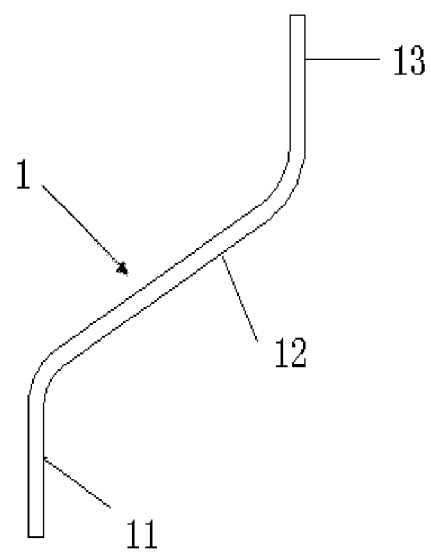
FIGS. 1-1 and 1-2 are schematic diagrams of the constant-force spring used in each of the preferred examples of the present invention.
Figures 1, 2:
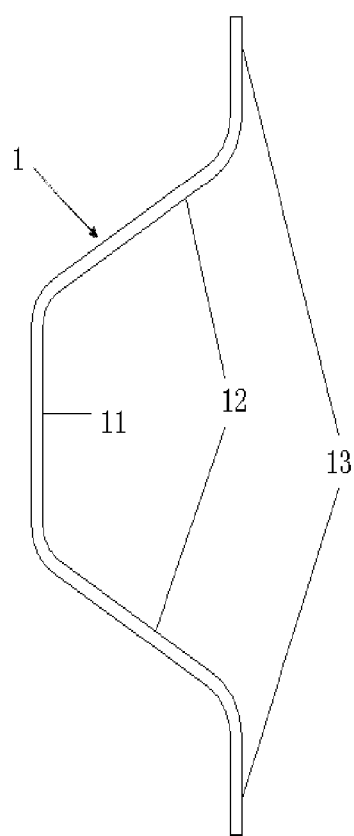
Figures 1, 2:
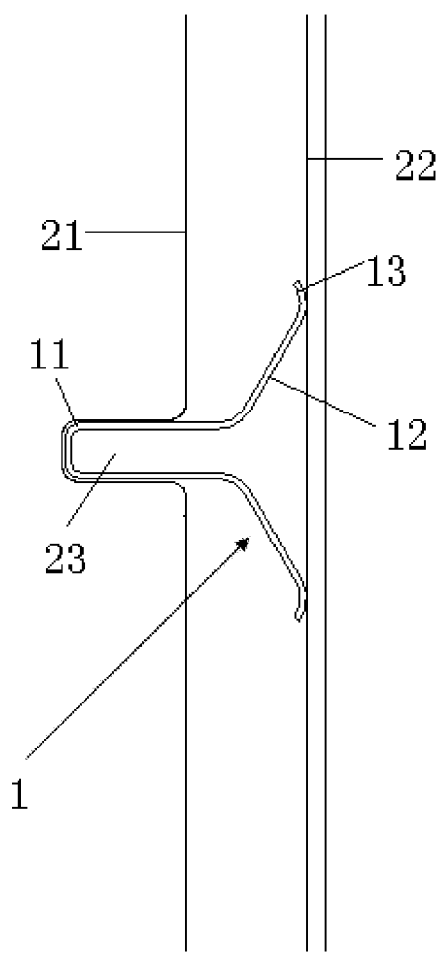
Figure 2:
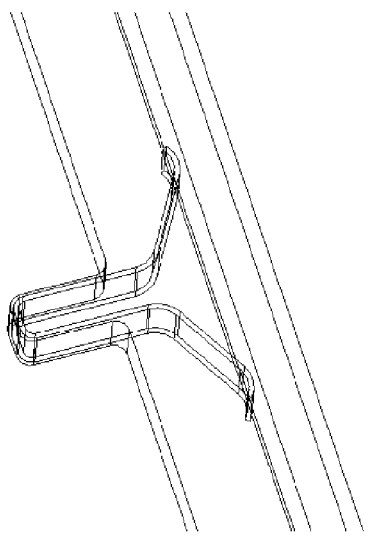

FIGS. 1-1 and 1-2 show the structure of the constant-force spring 1 used in each of the preferred examples of the present invention. The constant-force spring 1 has a fixing end 11 and a support end 12, the fixing end 11 being fixed at the side edge of the light guide plate 31, the support end 12 forming an elastic foot 13 that abuts against the backplane 32. The fixing end 11, the support end 12 and the foot 13 are all plate-shaped, wherein the fixing end 11 is substantially parallel to the foot 13, and the support end 12 is connected between the fixing end 11 and the foot 13 and extends in the direction such that the fixing end 11 forms a certain angle with the foot 13 (preferably 120°-135°), making the fixing end 11 staggered a certain distance to the foot 13. The constant-force spring 1 as shown in FIG. 1-1 is a one-foot spring, with one foot 13 abutting against the backplane. The constant-force spring 1 as shown in FIG. 1-2 is a two-foot spring, with two feet 13 abutting against the backplane 32 and opened outwardly. The reacting force provided by both of the springs after being pre-compressed is a constant force, such that the strength for fixing the light guide plate 31 will not change with the expansion of the light guide plate, which not only effectively and evenly releases the deformation resulted from expansion, but also prevents uneven local deformation of the light guide plate 31 caused by excessive squeeze of the light guide plate 31. The strength of the reacting force of the constant-force spring 1 is related to thickness of the spring and the used material.

FIGS. 2-1 and 2-2 show the light guide plate fixing structure provided by the first preferred example of the present invention, which is used for fixing the light guide plate 31 on the backplane 32 of the backlight module. The light guide plate fixing structure comprises a first abutting wall 21 formed at the side edge of the light guide plate 31, a second abutting wall 22 formed on the backplane 32, and a constant-force spring 1 arranged between the first abutting wall 21 and the second abutting wall 22. The first abutting wall 21 can be any portion of the side edge of the light guide plate 31, and the second abutting wall 22 can be any portion of the frame of the backplane 32 opposite to the first abutting wall 21. The first abutting wall 21 is provided with a recess 23 adapted to the shape of the fixing end 11, the fixing end 11 of the constant-force spring 1 is arranged inside the recess 23, the foot 13 abuts against the second abutting wall 22 on the backplane 32, and, with the help of an elastic force produced by bounce of the constant-force spring after being pre-compressed, the fixing end 11 of the constant-force spring 1 generates a trend of opening outwardly, and is thus compressed tightly inside the recess 23, so as to be engaged firmly with the recess 23 while fix the light guide plate 31.

Figures 1, 3:
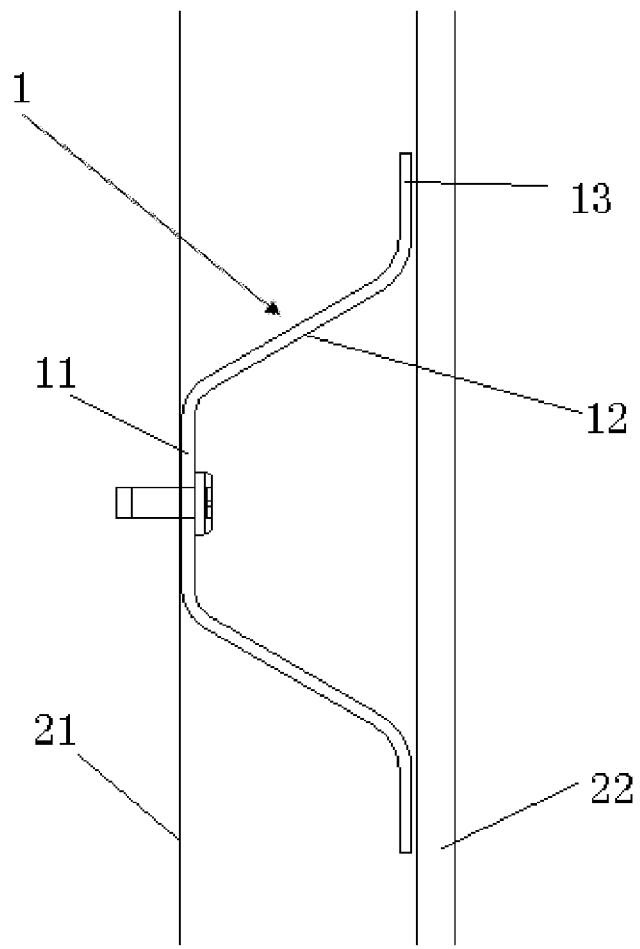
Figures 2, 3:
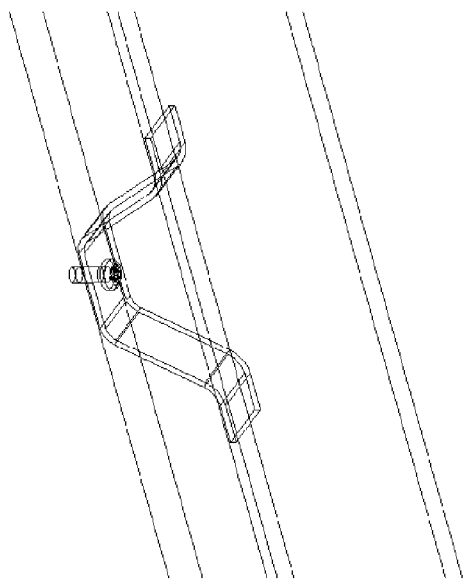

FIGS. 3-1 and 3-2 show the light guide plate fixing structure provided by the second preferred example of the present invention. The light guide plate fixing structure of this second preferred example is distinguished from that of the above first preferred example only in the following aspects: in the light guide plate fixing structure of this second preferred example, the fixing end 11 of the constant-force spring 1 is fixed on the first abutting wall 21 through a bolt, and the foot 13 abuts against the second abutting wall 22, thus fixing the light guide plate 31 with the help of an elastic force produced by the bounce trend of the constant-force spring 1 after being pre-compressed.

Figures 1, 4:
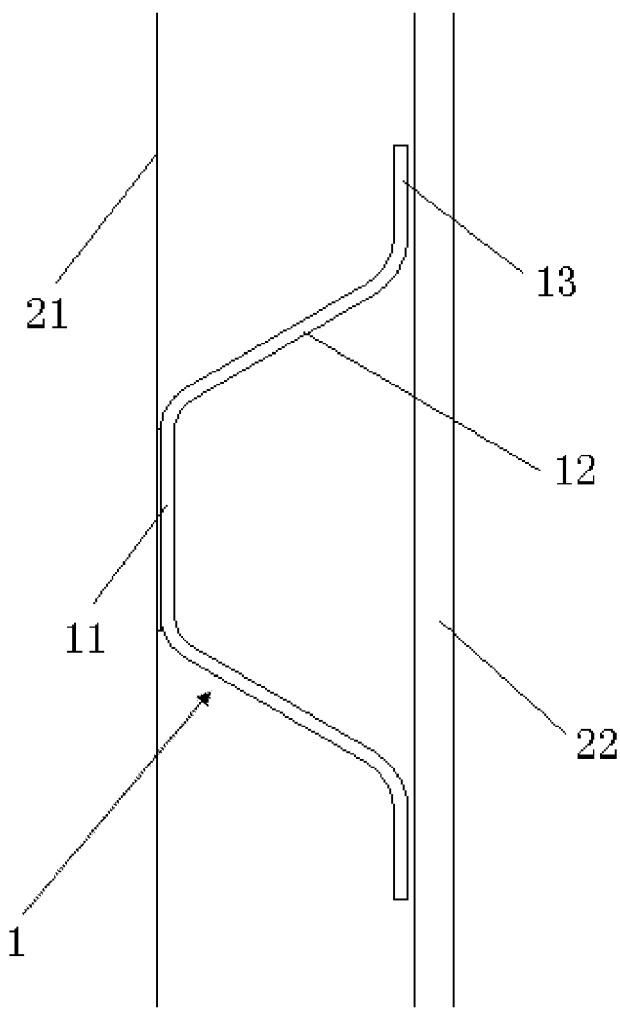
Figures 2, 4:
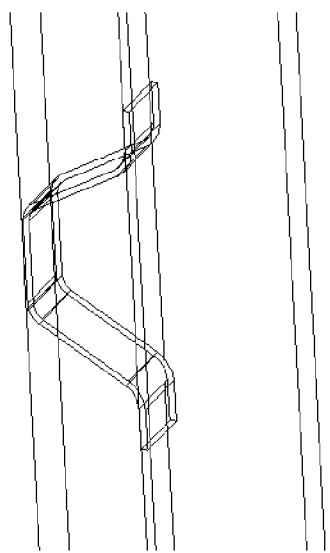

FIGS. 4-1 and 4-2 show the light guide plate fixing structure provided by the third preferred example of the present invention, The light guide plate fixing structure of this third preferred example is distinguished from that of the above first preferred example only in the following aspects: in the light guide plate fixing structure of this third preferred example, the fixing end 11 of the constant-force spring 1 is fixed on the first abutting wall 21 with adhesive, and the foot 13 abuts against the second abutting wall 22, thus fixing the light guide plate 31 with the help of an elastic force produced by the bounce trend of the constant-force spring 1 after being pre-compressed.

The constant-force springs as shown in the above FIG. 2-1 to FIG. 4-2 are all a two-foot spring; it can be understood that if the constant-force spring 1 used in other examples is a one-foot spring, the above fixing method can also be used for assembly, with the specific assembly method not necessary to be described here again.

Figures 1, 5:
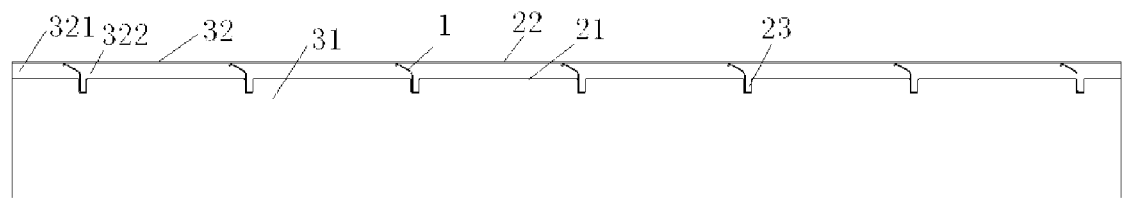
Figures 2, 5:
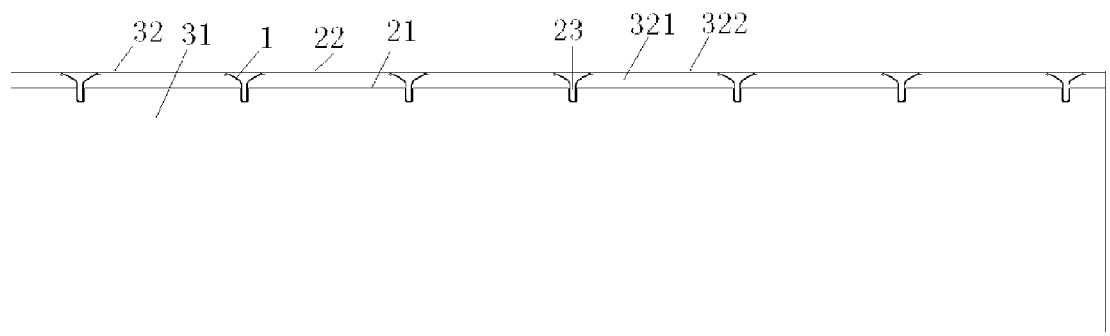

FIGS. 5-1 and 5-2 show a backlight module provided by the preferred example of the present invention, wherein the light guide plate fixing structure of the first preferred example of the present invention is used. This backlight module includes a light guide plate 31, an LED group (not shown in the diagram), a backplane 32 and a constant-force spring 1, the LED group is located between the light guide plate 31 and the backplane 32, the light emitted by the LED group becomes a uniform surface light source after transmitting through the light guide plate. According to the general knowledge, the light guide plate 31 and the backplane 32 usually have a rectangular shape, the backplane 32 includes an underplate 321 and a frame 322 vertically connected to the edge of the underplate, and the light guide plate 31 is accommodated inside the frame 322 and parallel with the underplate, with the LED group sandwiched between the light guide plate 31 and the underplate.

According to the above structure, there may be four first abutting walls 21, which are formed on the four side edges of the light guide plate 31, respectively; the above frame, having a square shape, can be used as the second abutting wall 22 as a whole; the light guide plate 31 is accommodated inside the second abutting wall 22, with the four first abutting walls 21 aligned with the four sides of the inner wall of the second abutting wall 22, respectively. There are multiple constant-force springs 1, whose fixing ends 11 are fixed on the four first abutting walls 21, respectively, with the amount of the constant-force springs fixed on each of the first abutting walls 21 not less than 2, preferably not less than 4. There may also be two first abutting walls 21, which are respectively formed at two of the four side edges of the light guide plate 31 that are in parallel with each other; the second abutting wall 22 is box-shaped, the light guide plate 31 is accommodated inside the second abutting wall 22; there are multiple constant-force spring 1, whose fixing ends 11 are fixed on the two first abutting walls 21, respectively, with the amount of the constant-force spring 1 fixed on each of the first abutting walls 21 not less than 2, preferably not less than 4. Because the light guide plate 31 is provided at its each side wall with a plurality of the constant-force springs 1, the plurality of the constant-force springs 1 can be guaranteed to produce a reacting force enough for fixing the light guide plate 31, and meanwhile the pressure applied to the edge of the light guide plate 31 is made more scattered and uniform, thereby preventing the light guide plate 31 from producing irregular local deformation because of pressure. When the light guide plate 31 is expanded due to heat or moisture, the fixing end 11 of the constant-force spring 1 is subjected to squeeze, which correspondingly causes the foot 13 to produce flexible deformation, thus allowing the first abutting wall 21 on the light guide plate 31 to get close to the second abutting wall 22 on the underplate. This can evenly release the expansion of the light guide plate 31, and prevent the light guide plate 31 from producing irregular deformation. When the light guide plate 31 is contracted, the constant-force spring 1 can be recovered to the initial state.

The backlight module of other examples of the present invention can use the light guide plate fixing structure of the second preferred example of the present invention and the light guide plate fixing structure of the third preferred example as described above. Compare with the backlight module as shown in FIGS. 5-1 and 5-2, the light guide plate fixing structure of the second preferred example of the present invention is distinguished from the backlight module of the light guide plate fixing structure of the third preferred example only in that the fixing end 11 of the constant-force spring 1 is fixed on the light guide plate 31 in a different way, with the other aspects all the same, and will thus not be described here in detail.

The backlight module and its light guide plate fixing structure of the present invention, having a firm structure and a reduced cost, can fix the light guide plate 31 firmly and uniformly while effectively release the expansion of the light guide plate 31, so as to avoid inhomogeneous deformation of the light guide plate 31 because of expansion.

All the above are only the preferred examples of the present invention, and do not limit the present invention. Any amendment, equivalent replacement, improvement, etc. within the spirit and principle of the present invention shall fall within the protection scope of the present invention.

What is claimed is:

1. A light guide plate fixing structure, for fixing a light guide plate on a backplane of a backlight module, wherein the light guide plate fixing structure comprises a first abutting wall formed at a side edge of the light guide plate, a second abutting wall formed on the backplane, and a constant-force spring arranged between the first abutting wall and the second abutting wall; the constant-force spring has a fixing end and a support end, the fixing end being fixed on the first abutting wall, the support end forming an elastic foot that abuts against the second abutting wall; and
    the fixing end is fixed by a bolt or glued to the first abutting wall.

2. The light guide plate fixing structure according to claim 1, wherein there are four first abutting walls, which are formed on four side edges of the light guide plate, respectively; the second abutting wall is box-shaped, and accommodates the light guide plate; there are a plurality of the constant-force springs, whose fixing ends are fixed on the four first abutting walls, respectively, with the amount of the constant-force springs fixed on each of the first abutting walls not less than 2.

3. The light guide plate fixing structure according to claim 1, wherein there are four first abutting walls, which are formed on the four side edges of the light guide plate, respectively; the second abutting wall is box-shaped, and accommodates the light guide plate; there are a plurality of the constant-force springs, whose fixing ends are fixed on the four first abutting walls, respectively, with the amount of the constant-force springs fixed on each of the first abutting walls not less than 2.

4. The light guide plate fixing structure according to claim 1, wherein there are two first abutting walls, which are respectively formed at two of the four side edges of the light guide plate that are in parallel with each other; the second abutting wall is box-shaped, and accommodates the light guide plate; there are a plurality of the constant-force springs, whose fixing ends are fixed on the two first abutting walls, respectively, with the amount of the constant-force springs fixed on each of the first abutting walls not less than 2.

5. A backlight module, comprising a light guide plate, an LED array and a backplane, with the LED array arranged between the light guide plate and the backplane, wherein the backlight module further comprises a first abutting wall formed at the side edge of the light guide plate, a second abutting wall formed on the backplane, and a constant-force spring arranged between the first abutting wall and the second abutting wall; the constant-force spring has a fixing end and a support end, the fixing end being fixed on the first abutting wall, the support end forming an elastic foot that abuts against the second abutting wall; and
    the fixing end is fixed by a bolt or glued to the first abutting wall.

6. The backlight module according to claim 5, wherein there are four first abutting walls, which are formed on the four side edges of the light guide plate, respectively; the second abutting wall is box-shaped, and accommodates the light guide plate; there are a plurality of the constant-force springs, whose fixing ends are fixed on the four first abutting walls, respectively, with the amount of the constant-force springs fixed on each of the first abutting walls not less than 2.

7. The backlight module according to claim 5, wherein there are two first abutting walls, which are respectively formed at two of the four side edges of the light guide plate that are in parallel with each other; the second abutting wall is box-shaped, and accommodates the light guide plate; there are a plurality of the constant-force springs, whose fixing ends are fixed on the two first abutting walls, respectively, with the amount of the constant-force springs fixed on each of the first abutting walls not less than 2.

* * * * *